Figure 1:
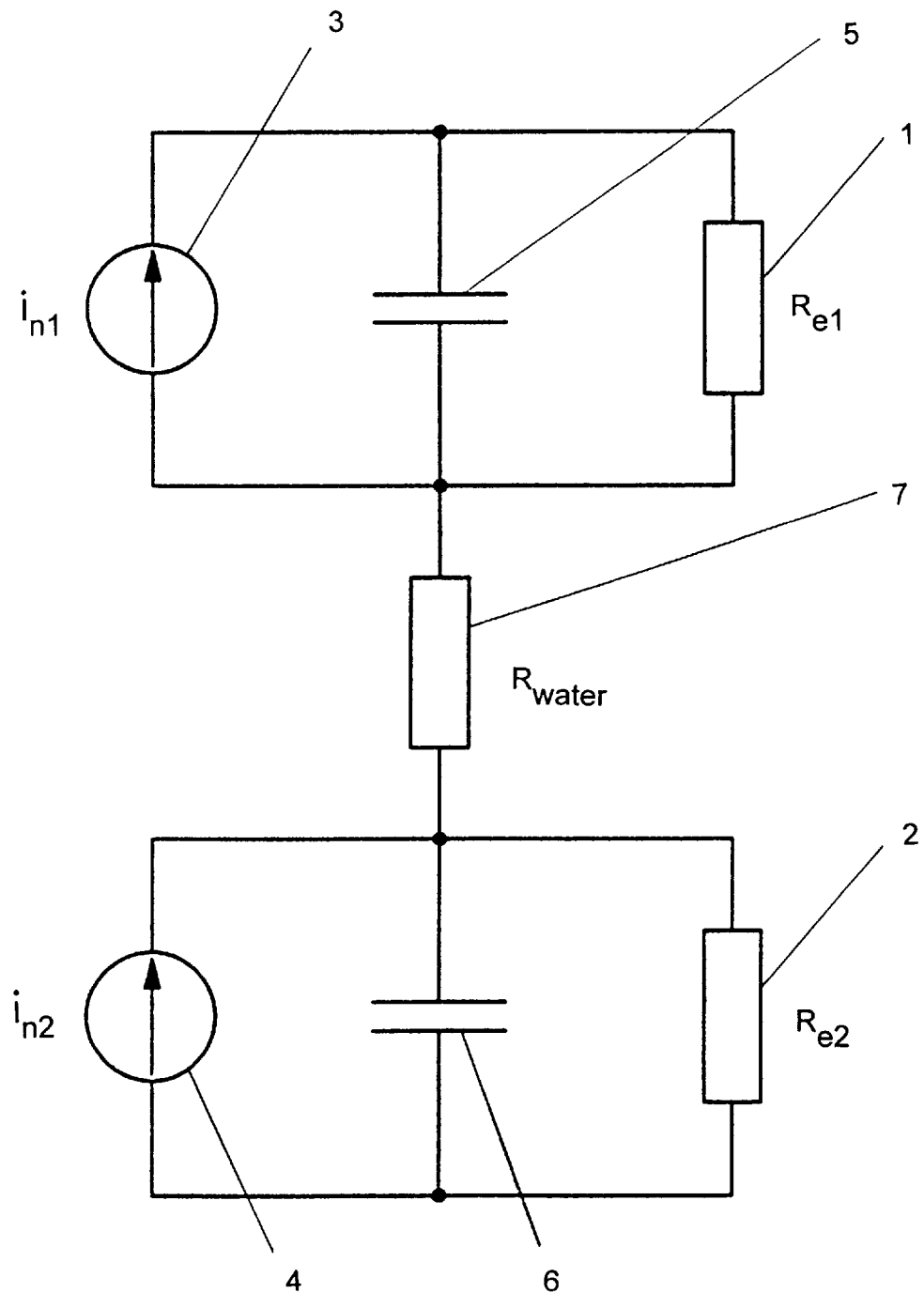

United States Patent [19]
Seppä et al.

[11] Patent Number: 5,824,914
[45] Date of Patent: Oct. 20, 1998

[54] METHOD AND ARRANGEMENT FOR MEASURING THE FLOW VELOCITY OF A LIQUID, PARTICULARLY WATER

[75] Inventors: Heikki Seppä, Helsinki; Timo Varpula, Vantaa; Arto Sakari Sunila, Rauma; Janne-Yrjö Antola, Laitila, all of Finland

[73] Assignee: Oras Oy, Rauma, Finland

[21] Appl. No.: 813,692

[22] Filed: Mar. 7, 1997

[51] Int. Cl.⁶ ........................................ G01F 1/58
[52] U.S. Cl. ........................................ 73/861.11
[58] Field of Search ............... 73/861.11, 861.12, 73/861.08, 861.13, 861.14, 861.15, 861.16, 861.17, 861.18, 194

[56] References Cited

U.S. PATENT DOCUMENTS

| | | | |
|---|---|---|---|
| 3,722,274 | 3/1973 | Natens et al. ............................ | 73/194 |
| 3,802,263 | 4/1974 | Krechmery et al. ...................... | 73/194 |
| 4,106,337 | 8/1978 | Trietley et al. .......................... | 73/194 |
| 5,417,118 | 5/1995 | Lew et al. ............................... | 73/861.12 |

*Primary Examiner*—Richard Chilcot
*Assistant Examiner*—Jewel Thompson
*Attorney, Agent, or Firm*—McAulay Fisher Nissen Goldberg & Kiel, LLP

[57] ABSTRACT

The invention relates to a method and arrangement for measuring using magnetic flow measurement, the flow velocity of a liquid, particularly water. In the solution according to the invention, a component that is in the same phase with the magnetic field is measured from the sinusoidal voltage induced in the electrodes. The solution according to the invention can be utilized, for example, in measuring the flow velocity of water flowing in a water pipeline.

20 Claims, 2 Drawing Sheets

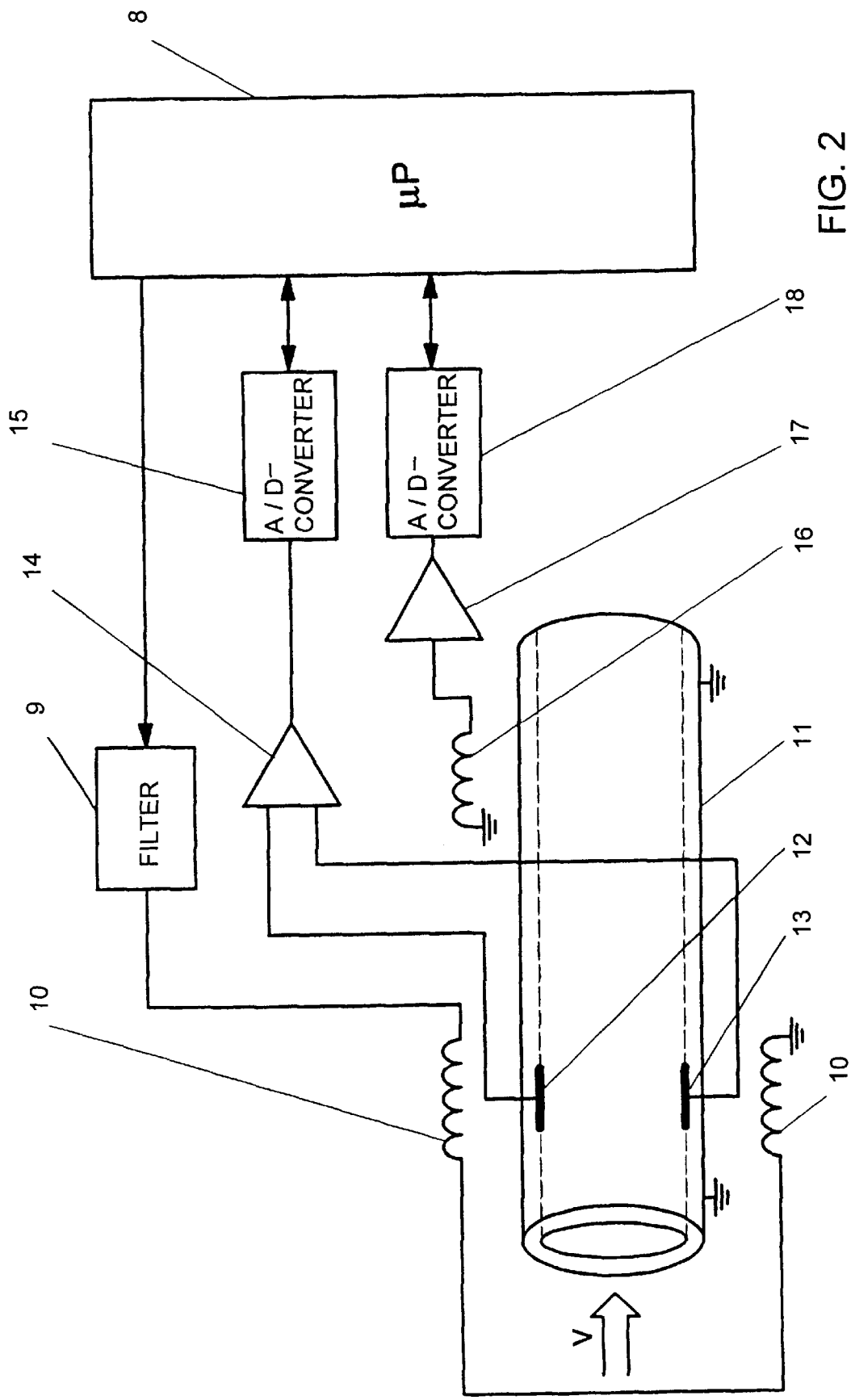

METHOD AND ARRANGEMENT FOR MEASURING THE FLOW VELOCITY OF A LIQUID, PARTICULARLY WATER

The invention relates to a method and arrangement for measuring the flow velocity of a liquid, particularly water, The solution in accordance with the invention can be utilized, for example, in measuring the flow velocity of water flowing in a water pipeline. Although the analysis given here deals mainly with the measurement of the flow velocity of water in different kinds of water mains, the invention can be employed as such for measuring the flow velocities of several different types of liquids in different kinds of tanks, piping and piping sections.

Water flow can be measured in several different ways. One possibility is to use an ultrasonic means and the related doppler shift that is generated by the flow. The flow can also be measured by the cross-correlation method, for example, by measuring the temperature of the water at two different places in the pipe.

Flow meters, which are based on the principle of thermal mass transfer, measure changes in the characteristics of the heat transfer in a flowing liquid. The literature on the subject describes numerous flow meters for thermal mass transfer and manufacturers offer commercially a number of heat flow meters worldwide.

Liquid flow meters based on the transfer of a heat mass are often used in measuring gas flow and even for measuring the intake air of a diesel or jet engine. The principle of the transfer of a heat mass can thus be used just as well for low-cost, reliable or critical, demanding applications.

Liquid flow meters based on the transfer of a heat mass cannot be used to good effect in measuring a liquid or in general liquid applications owing to serious technical difficulties.

The most significant problems are the variations in the viscosity of liquids as well as the changes in thermal conductivity and density in step with the temperature. The thermal resistance equation of a liquid flow meter can be expressed as follows:

$$Q=[B+C(mC_p/k)^m(rvd/m)^n]kA(\Delta T)/d$$

where Q is the quantity of heat, B is the intrinsic conductivity factor, C is a constant, m is the viscosity of the liquids, $C_p$ is the specific heat capacity of the liquid, k is the thermal conductivity of the liquid, a is the sensor's area, $\Delta T$ is the temperature rise, d is the diameter of the sensor, $mC_p$ is the Prandtl number and r v d / m is the Reynolds number.

The variations in quantities are much greater for liquids than for gases. Accordingly, establishing the relation between the characteristics of the heat transfer and the flow is very problematical for a liquid and especially for a liquid at different temperatures.

Water measurement is needed to an ever greater extent in municipal use and in energy management, not to mention the inevitably growing significance of saving water. In particular, in a number of household applications water charges are billed on a building-specific basis and private residents have no incentive to save. The same argument applies to hot water networks, which make use of the common district heating stations provided by society.

The existing municipal flow meters are commonly of a mechanical, precise, movable type. These meters can be manufactured relatively cheaply, are in use for a long time and are the hobbyhorse of the water measurement industry. There are many different models of them. The movable mechanical parts are nevertheless susceptible to wear and the meter is not suited to very intelligent water and energy management systems without considerable modifications.

Magnetic flow measurement is based on the principle that in a magnetic field the so-called Lorenz force acts on the charges flowing in the liquid. The phenomenon causes part of the charges to move to the walls of the pipe because of the flow and the magnetic field, and the electric field generated by the charge imbalance thus arising cancels out the voltage caused by the flow. When the system is in balance, the voltage acting across the pipe is directly proportional to the product of the flow velocity and the magnetic field.

Because the voltage is a linear function of the flow velocity, the measurement can be arranged in such a way that the result is integrated over the whole cross-section of the pipe. For this reason, the magnetic flow measurement method is especially well-suited to measuring the flow velocity of liquids. A magnetic flow velocity meter requires that the liquid has sufficient electric conductivity.

A magnetic flow velocity meter involves a number of problems. The voltage that is produced is generally very small, and even at large velocities, it is only of the order of 1 mV with reasonable values of the magnetic field (1 mT) When using a permanent magnet, the constant flow velocity leads to the generation of direct-current voltage between the electrodes. Measuring the dc voltage at an uncertainty of less than 1 $\mu$V is nearly impossible owing to the drift of the offset voltage and the offset current. In addition, measurement is hampered by the voltage between the electrode and the liquid. Although the dc voltage over both electrodes is small, it varies with the flow, causing noise.

It has been attempted to eliminate these problems by using a pulse-type magnetic field instead of a static magnetic field. The polarity of the field is changed at even intervals and the voltage difference generated across the electrodes is measured at different polarities of the field. Switching the magnetic field induces a voltage in the electrodes and this is why after the change, it is necessary to wait for the voltage to stabilize. The time needed for the stabilization determines how often the polarity of the magnetic field can be changed. Because the signal is pulse-like and the frequency is low, the coil cannot be tuned to the resonance, which would enable the power consumption of the device to be made small.

In addition to the pulse-type magnetic field, a technique is known in which a sinusoidal alternating current magnetic field is used. In this technology, the phase difference between two sinusoidal alternating current voltages is measured. The method involves measuring the phase difference in two alternative ways: between the ac voltage of the electrode pair measuring the flow signal and the electric current generating the magnetic field or between the ac voltage of the electrode pair measuring the flow signal and the ac voltage of another electrode pair in the liquid. The weakness of the method is that the phase difference is not in a linear relation to the flow velocity of the liquid. A more serious drawback is that the phase difference can depend on the electrical conductivity, and temperature of the liquid in so far as the magnetic field in the area of the electrodes is not homogeneous. In practice the magnetic field is always somewhat non-homogeneous. The phenomenon can be explained as follows. When the liquid flows, the effective flow path between the electrodes is a function of the flow of the liquid because the flow transports charges along with it. Now, in a non-homogeneous magnetic field, an induced component is created in the current circuit formed by the electrodes and the liquid, and this component changes the phase of the voltage between the electrodes. The geometry of the effective current path between the electrodes depends on the electrical conductivity and temperature of the liquid. Accordingly, the phase of the voltage between the electrodes. is also dependent on these factors.

The prior art is described in the following with reference to the accompanying FIG. 1, which shows, for a magnetic flow measurement system according to the prior art, a simplified electrical equivalent circuit of two electrodes in water.

In water, electric current is carried by ions, whereas in a metal by electrons. When a metal is immerged in water, an ion layer arises in the interface between the metal and water owing to the difference in chemical potential. At small frequencies, the electrons pass into the water and from the water into the metal via a chemical reaction. This reaction represents a certain interface resistance between the electrode and the water.

FIG. 1 shows, for a magnetic flow measurement system according to the prior art, a simplified equivalent circuit of two electrodes in water. In the figure, the interfaces are described by resistors 1, 2 and by the current generators 3, 4, which generate a voltage across the interfaces 1, 2. If both electrodes are identical, the total potential between the two electrodes is very close to zero. Because at interfaces 1, 2 the electrons of the metal and the ions of the liquid are very close to each other (0.2–1 nm), very large capacitances 5, 6 are generated across the interfaces 1, 2. The resistance caused by the water is marked with the number 7.

Taking into account the resistance caused by the conductivity of the water, the system can be described electrically in the manner shown in FIG. 1. When the flow disturbs the diffusion layer of the ions at the interface 1, 2, the current generator 3, 4 that is marked in the figure generates an ac voltage across the interface 1, 2.

Under flow conditions, the current generators 3, 4 differ from each other, for which reason the electrode potential varies. The power density connected with the voltage variation can be up to 1 $\mu$V /√Hz at small frequencies. Because of the slowness of the variations in flow, there are no voltage variations at high frequencies. In addition, the contact capacitance prevents voltage variations from arising at high frequencies. Owing to these phenomena, the flow-induced noise voltage of the electrodes is attenuated very strongly as the frequency increases.

The thermal noise is proportional to the real part of the impedance Z caused by the water. As a formula, this can be expressed in the form: $S_u = 4k_B T Re\{Z\}$, where $S_u$ is the power frequency of the noise, the constant $k_B = 1.38 \cdot 10^{-23}$ J/K, T is the absolute temperature and $Re\{Z\}$ describes the real part of the impedance. According to the equivalent circuit shown in FIG. 1, the real part diminishes as the frequency increases until the impedance is determined solely by the conductivity of the water.

It follows from the above that the thermal voltage variation seen by the electrodes diminishes as a function of the frequency until it is determined solely by the resistance generated by the water. In practice, the frequency should be nearly 1 kHz or larger before the voltage variation is determined solely by the thermal noise of the water's resistance. Typically, at 1 kHz the voltage variation is about 20nV/√Hz Because a good amplifier does not increase voltage noise significantly, at high frequencies the noise of the electrode at an appropriate flow can be nearly one hundred times smaller than at low frequencies. If a magnetic flow meter were used at a high frequency (about 1 kHz), the dynamics of the flow meter could be improved significantly or, correspondingly, the magnetic field could be reduced.

The magnetic flow meter could be improved substantially by increasing the frequency of the magnetic field. With present-day pulse technology this is not possible because the induced voltage hampers measurement of the voltage.

The purpose of the present invention is to provide a solution for measuring the flow velocity of a liquid, particularly water, whereby a magnetic flow measurement is used, thereby enabling the above described deficiencies and problems to be solved. To accomplish this, the method according to the invention is characterized by the fact that only the component that is in the same phase with the magnetic field is measured from the sinusoidal voltage that is generated in the electrodes. In addition, the measurement system according to the invention is characterized by the fact that the arrangement comprises a microprocessor, a filter, a tuned coil, a liquid flow pipe, electrodes, a differential amplifier, a magnetic field measuring coil, an amplifier and A/D converters in such a way that the microprocessor produces a square signal that is brought via the filter to the tuned coil, the flow of the liquid in the liquid flow pipe is measured as the potential given by the electrodes, the electrode potential is amplified with the differential amplifier and brought to the A/D converter, the strength of the magnetic field is measured with the magnetic field measuring coil and the voltage that is proportional to the derivative of the magnetic field is amplified with the amplifier and sent to the A/D converter.

In the solution according to the invention, a sinusoidal magnetic field is used, whose frequency is markedly greater than that permitted by present-day pulse technology (100 Hz –10 kHz). The solution according to the invention is based on the concept that in magnetic flow measurement, only the component that is in the same phase with the magnetic field is measured from the sinusoidal voltage induced in the electrodes, thus eliminating the effect of induced voltage.

The magnetic field is measured, for example, with a separate coil and the comparison voltage obtained from the measurement is used as a reference for a phase-sensitive sensor. We can write the induction voltage of the magnetic field obtained from the induction coil in the form:

$$U_{ind} = \alpha \omega B \cos(wt),$$

where $\alpha$ is a constants $\omega$ is the angular frequency and B describes the average magnetic field at the induction coil. The voltage induced in the electrodes can be given in the form $$U_c = bvB \sin(wt + \Delta_{p1}) + c\omega B \cos(wt + \Delta_{p2})$$

where b and c are constants associated with the meter and v is the average flow velocity of the liquid, Since the magnetic field affecting the electrode through the Lorenz force and the magnetic field induced to the electrode are not in the same phase as the magnetic field at the measurement coil, we have to assume that the equation includes the phase shifts $\Delta_{pi}$, where i=1 or 2. If the phase shifts are produced by the delay, we can write them by means of the natural undamped frequencies as follows:

$$\Delta_{p1} = \omega/\omega_1 \text{ and } \Delta_{p2} = \omega/\omega_2.$$

When we express the electrode voltage $U_c$ by means of the induction voltage $U_{ind}$ and we take into account both the phase and the amplitude, we obtain a sinusoidal voltage of the form:

$$U_{sin} = v \frac{b}{\alpha\omega} \cos\left(\frac{\omega}{\omega_1}\right) - \frac{c}{\alpha} \sin\left(\frac{\omega}{\omega_2}\right)$$

If the phase shifts are time-dependent, the measurement can involve both an amplification error and a variable displacement of the zero point. If we adjust the phase measurement in such a way that we compensate for the phase shift $\Delta_{\rho 2}=\omega/\omega_2$, we obtain a result of the form:

$$U_{sin} = v \frac{b}{\alpha\omega} \cos\left(\frac{\omega}{\omega_1}\right)$$

According to the equation the result is zero when the flow is zero and thus a fixed phase shift does not cause an off-set voltage affecting the measurement.

Another way to control phase shifts is to use two adjacent frequencies ($\omega_a$ and $\omega_b$) and to calculate the flow velocity from the results. If we assume that the corresponding voltages are $U_a$ and $U_b$, we obtain the flow velocity from the following equation, when we also assume that the phase shifts are very small:

$$v = \frac{a}{b} \frac{\omega_a \omega_b (\omega_b U_a - \omega_a U_b)}{\omega_b^2 - \omega_a^2}$$

According to the result, the double frequency technique enables one to eliminate the effect of phase shifts. With double frequency technique, tuning the coil is nevertheless more difficult than when using one frequency.

In the following the invention is described in detail with reference to the accompanying figures, in which:

FIG. 1 shows, for the magnetic flow measuring system according to the prior art discussed above, a simplified electrical equivalent circuit of two electrodes in water, FIG. 2 shows the block diagram of the arrangement for measuring the flow velocity of a liquid according to the invention.

The solution according to the invention is described in the following with reference to FIG. 2, which shows the block diagram of an arrangement for measuring the flow velocity of a liquid according to the invention. The measuring arrangement according to the invention comprises a microprocessor 8, a filter 9, a tuned coil 10, a liquid flow pipe 11, electrodes 12, 13, a differential amplifier 14, a magnetic field measuring coil 16, an amplifier 17 and A/D converters 15, 18.

In the measuring arrangement according to the invention, microprocessor 8 produces a square signal which is brought via filter 9 to the tuned coil 10. Filter 9 and tuned coil 10 render the magnetic field sinusoidal. The tuning also reduces the current consumption of the device.

The flow of the liquid in the liquid flow pipe 11 is measured as the potential given by electrodes 12, 13. The electrode potential is amplified with the differential amplifier 14 and brought to the A/D converter 15. A two-channel Sigma/Delta converter is especially well suited to the purpose.

By means of magnetic field measuring coil 16, the strength of the magnetic field is measured and the voltage that is proportional to the derivative of the magnetic field is amplified with amplifier 17 and routed to the A/D converter 18. Samples of the measurements are taken at a frequency greater than the measuring frequency in order to prevent folding of the noise.

Phase-sensitive sensing is accomplished mathematically in the method by means of microprocessor 8. This means that any distortion in the signal will not hamper the measurement significantly. If the voltage references of both A/D converters 15, 18 are the same, the ultimate result will not depend on the drift of the voltage reference. Because the result is proportional to the measuring frequency, the crystal of the microprocessor 8 should be selected in such a way that the largest possible frequency drift is as small as possible.

The realization makes possible sensing at both one frequency and two frequencies. If the dynamics of the A/D converter 15 is 14 bits or more, amplifier 14 need not necessarily be a variable amplifier. A simple 8 bit converter can also be used as the A/D converter 15, but in this case it is absolutely necessary to use an adaptive voltage amplifier as amplifier 14.

The arrangement for measuring the flow velocity of a liquid, shown in FIG. 2, can also be used in the double frequency technique. Filter 9 and the tuning of coil 10 nevertheless have to be modified for the purpose.

The use of a sinusoidal magnetic field and phase-sensitive sensing in a magnetic flow meter improves the signal-to-noise ratio significantly because the noise of the electrodes remains very small. Phase-sensitive sensing enables the effect of the induced voltage of the magnetic field to be eliminated.

The more homogeneous the magnetic field, the smaller are the eddy current losses in the magnetic fields, and the better the phase-sensitive sensing that is provided, the greater the frequency can be. An appropriate measuring frequency is in the range 100 Hz–1 kHz because the noise of the electrodes no longer diminishes a great deal at frequencies greater than 100 Hz.

Tuning of the coil is nevertheless easier to do the greater the frequency is. The frequency should be selected to be either the same as a multiple of the network frequency or else it should clearly diverge from the harmonic waves of the network frequency in order to avoid interference.

We claim:

1. A method for measuring the flow velocity of a liquid, particularly water using magnetic flow measurement, wherein from a sinusoidal signal induced into electrodes, the amplitude of a component of said sinusoidal signal that is in the same phase with the magnetic field is measured.

2. A method according to claim 1, wherein the magnetic field is measured with a separate coil and a comparison voltage is obtained from the measurement and is used as a reference for a phase-sensitive detector.

3. A method according to claim 2, wherein the electrode voltage $U_c$ is detected with induction voltage $U_{ind}$ in such a way that sinusoidal voltage $U_{sin}$ is obtained from the formula:

$$U_{sin} = v \frac{b}{\alpha\omega} \cos\left(\frac{\omega}{\omega_1}\right) - \frac{c}{a} \sin\left(\frac{\omega}{\omega_2}\right)$$

where
$U_c = bvB \sin(wt+\Delta_{\rho 1}) + c\omega B \cos(wt+\Delta_{\rho 2})$
$U_{ind} = \alpha\omega B \cos(wt)$,
$\alpha$ is a constant
$\omega$ is the angular frequency,
$\omega_1$ and $\omega_2$ are specific frequencies,
B is the average magnetic field at the induction coil,
b and c are constants associated with the meter,
v is the average flow velocity of the liquid and
$\Delta_{\rho 1}$ and $\Delta_{\rho 2}$ are phase shifts $\Delta_{\rho 1}=\omega/\omega_1$ and $\Delta_{\rho 2}=\omega_1/\omega_2$.

4. A method according to claim 2, wherein the phase shift $\Delta_{\omega 2}=\omega/\omega_2$ is compensated from a phase measurement by adjusting it in such a way that a sinusoidal voltage $U_{sin}$ is obtained from the formula:

$$U_{sin} = v \frac{b}{\alpha \omega} \cos\left(\frac{\omega}{\omega_1}\right)$$

in which
α is a constant,
ω is the angular frequency,
$\omega_1$ is the specific frequency,
b is a constant associated with the meter and
v is the average flow velocity of the liquid.

5. A method according to claim 2, wherein two adjacent frequencies ($\omega_a$ and $\omega_b$) are used and the average flow velocity of the liquid is calculated from the formula:

$$v = \frac{a}{b} \frac{\omega_a \omega_b (\omega_b U_a - \omega_a U_b)}{\omega_b^2 - \omega_a^2}$$

where
a is a constant
b is a constant associated with the meter,
$\omega_a$ and $\omega_b$ are two adjacent frequencies and
$U_a$ and $U_b$ are the voltages corresponding to the frequencies.

6. An arrangement for measuring flow velocity of a liquid, particularly water, which arrangement comprises
   a liquid flow pipe (11),
   potential measuring electrodes (12), (13), which are positioned at sides of the pipe and a coil (16) for measuring a magnetic field, which coil is placed in the vicinity of the pipe (11),
   characterized in that it furthermore comprises
   means (8) for producing a square signal, which signal is brought via a filter (9) to a tuned coil (10),
   amplifying means (14) for amplifying the electrode potential to an A/D converter (15)
   A/D converters (15, 18) for directing the amplified electrode potential and a derivative of the measured magnetic field to a microprocessor (8) for measuring, from the electrode potential, a component simultaneous with the magnetic field.

7. A measuring arrangement according to claim 6, wherein a two-channel Sigma/Delta converter is used as the A/D converter.

8. A measuring arrangement according to claim 6, including means for taking measuring samples from the sampling element at a frequency greater than the magnetizing frequency.

9. A measuring arrangement according to claim 6, wherein a phase-sensitive sensor of signals is implemented mathematically by means of a microprocessor (8).

10. A measuring arrangement according to claim 9, wherein same values serve as voltage references of the A/D converters (15), (18).

11. A measuring arrangement according to claim 9, wherein dynamics of the A/D converter (15) is at least 14 bits.

12. A measuring arrangement according to claim 9, wherein dynamics of the A/D converter (15) is 8 bits and the amplifier (14) is an adaptive voltage amplifier.

13. A measuring arrangement according to claim 9, wherein a measuring arrangement is used in double frequency technique in such a way that a filter (9) and the tuning of a coil (10) are altered to be suitable to the purpose.

14. An arrangement according to claim 9, wherein a measuring frequency is a multiple of the network frequency, most appropriately in the range 100 Hz–1 kHz.

15. A measuring arrangement according to claim 9, wherein a measuring frequency differs clearly from the harmonic waves of the network frequency.

16. A measuring arrangement according to claim 10, wherein the dynamics of the A/D converter (15) is at least 14 bits, and when the A/D converter 15 is 8 bits, the amplifier (14) is an adaptive voltage amplifier.

17. A measuring arrangement according to claim 16, wherein the measuring arrangement is used in double frequency technique in such a way that a filter (9) and the tuning of a coil (10) are altered to be suitable to the purpose.

18. An arrangement according to claim 16, wherein the measuring frequency is a multiple of the network frequency, most appropriately in the range 100 Hz–1 kHz.

19. A measuring arrangement according to claim 16, wherein the measuring frequency differs clearly from the harmonic waves of the network frequency.

20. A method for measuring flow velocity of a liquid, particularly water using magnetic flow measurement comprising measuring from a sinusoidal signal induced into electrodes the amplitude of a component of said signal that is in the same phase with a magnetic field and measuring the magnetic field with a separate coil to obtain a comparison voltage and using it as a reference for phase-sensitive detection.

* * * * *